Sept. 6, 1966  J. M. LAFFERTY  3,271,619
TRIGGERED VACUUM DISCHARGE DEVICE
Filed July 26, 1963  2 Sheets-Sheet 1
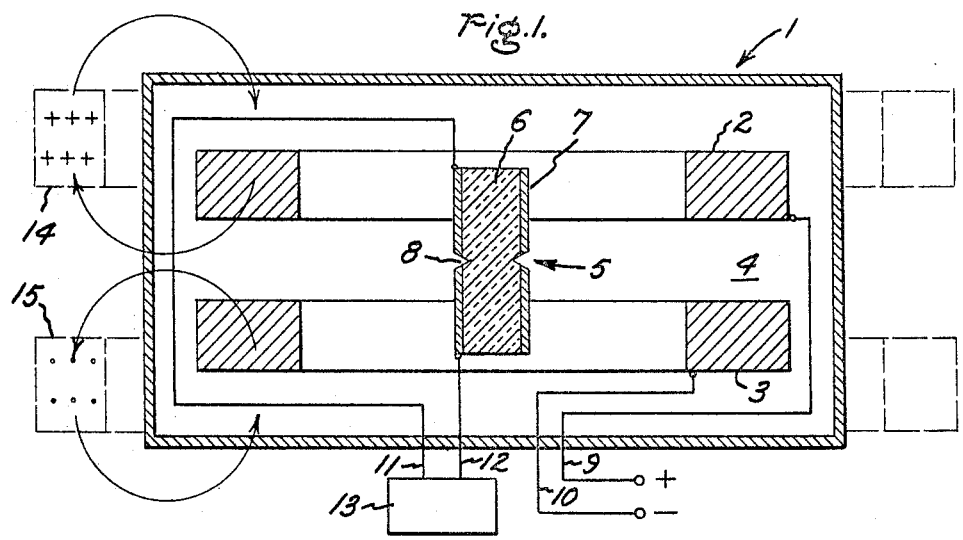
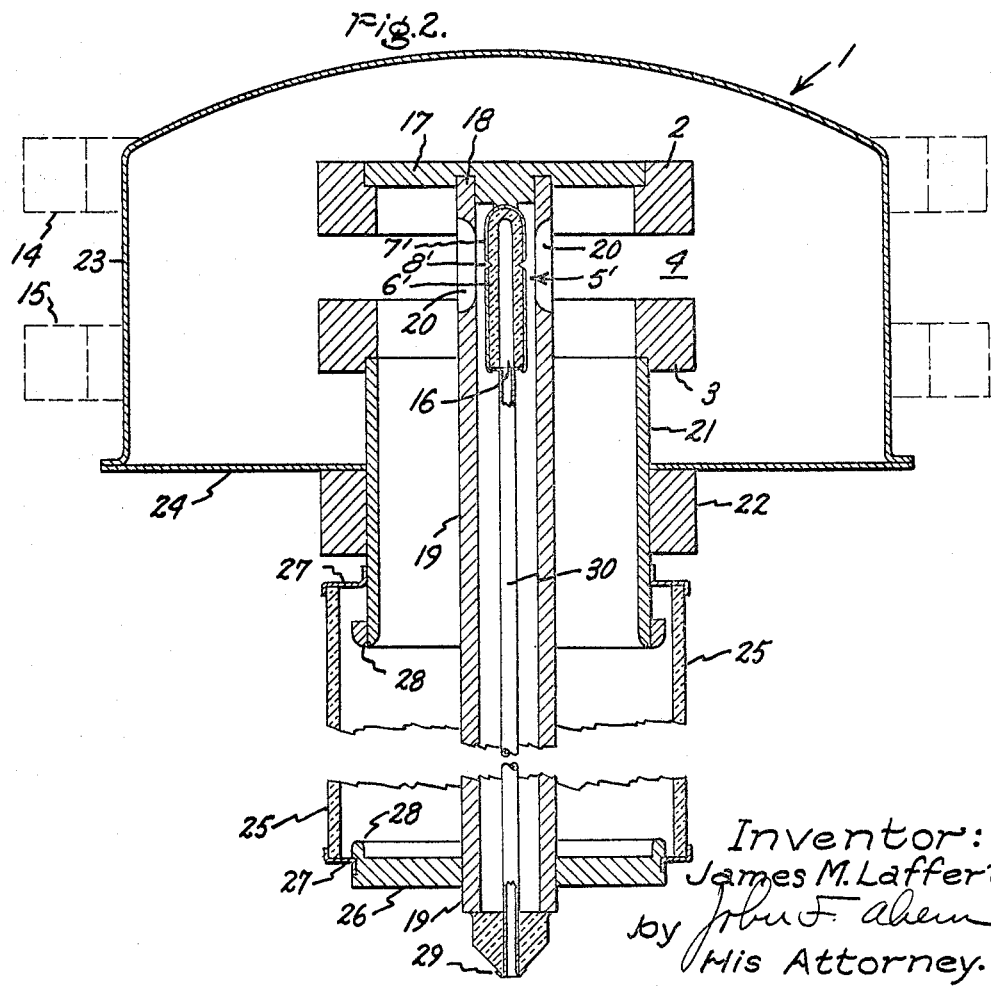
Inventor:
James M. Lafferty,
by John F. Ahern
His Attorney.

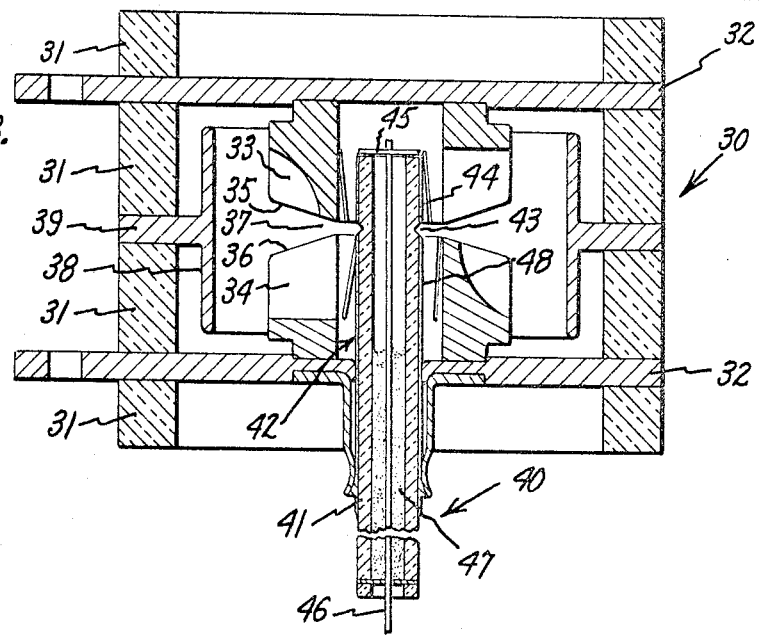
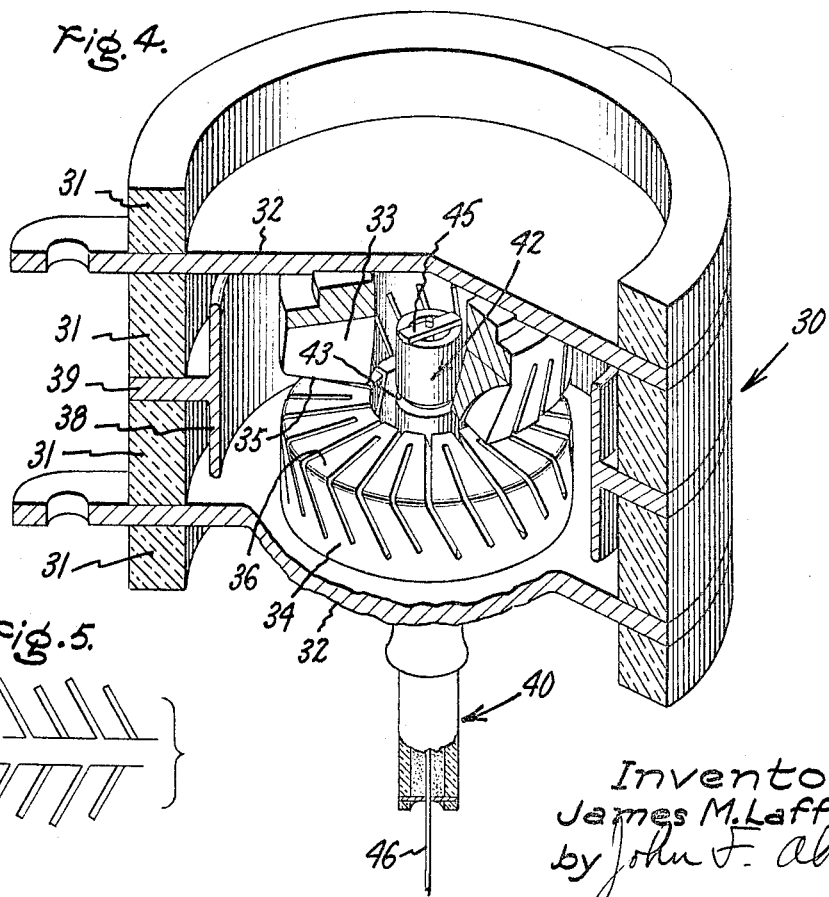
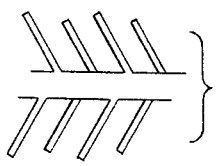

United States Patent Office 3,271,619
Patented Sept. 6, 1966

3,271,619
TRIGGERED VACUUM DISCHARGE DEVICE
James M. Lafferty, Schenectady, N.Y., assignor to General Electric Company, a corporation of New York
Filed July 26, 1963, Ser. No. 297,924
5 Claims. (Cl. 315—111)

The present invention relates to electric discharge devices adapted to switch high voltages and currents by triggering electric breakdown between a pair of fixed electrodes separated by a gap in vacuo, and more particularly relates to an improved high speed, high current adaptation thereof.

Gap switching devices are devices normally maintained in an open circuit condition which, when subjected to an appropriate signal, are switched to a closed circuit condition and pass electric current therethrough. Such devices are used to great advantage as overload protectors, lightning arresters and for the precision switching of extremely high voltages and currents, as for example, in discharging capacitor banks to obtain a very short pulse of extremely high current.

For these uses, gap discharge devices must be able to withstand high voltages and to break down or fire only when desired. They must be, for many applications, adapted to repeatedly fire, often thousands of times, in response to essentially the same breakdown conditions, with the same firing time. In other applications, as for example when used as lightning arresters, it is imperative that such gap devices have an extremely short recovery time so as to be ready to function again a short time after firing.

Most prior art gap discharge devices are charged with a gaseous atmosphere, often at super-atmospheric pressure. Although suitable for many applications, gaseous gap discharge devices usually have long recovery times, due to the necessity of ionized gases therein becoming de-ionized before full recovery is effected. Additionally, since the hold-off voltage of a gap discharge device is dependent upon the dielectric strength of the gas therein, gaseous gaps are often quite large when designated for use at high voltages.

Perhaps the greatest disadvantage of gaseous gap discharge devices, however, is due to the fact that with use, gas is removed or "cleaned-up" from the device by entrapment with deposited metallic particles which are sputtered from the electrodes of the gap. This "clean-up" changes the characteristic of the gap so that it does not perform reproducibly and the device must often be replaced long before actual failure.

Vacuum gap discharge devices have been proposed as a means to overcome many of these disadvantages. In theory, a vacuum gap discharge device would be smaller, due to the high dielectric strength of a vacuum; its recovery time would be much shorter; and, since there is no gas to be removed by sputtered metallic particles, a vacuum gap should not change its operating characteristics. In practice, however, prior art vacuum gap discharge devices have not proven to be reliable, either as to firing voltage, hold-off strength, or recovery time. In prior art vacuum spark gap devices, the operating characteristics seem to be a function of the device's past history, such as the time lapse since last firing. One explanation of this is that most prior art vacuum gaps do not operate at sufficiently high vacuum.

In my co-pending application, Serial Number 109,089, filed May 10, 1961, and assigned to the assignee of the present application, there are disclosed triggered vacuum discharge devices which comprises a pair of primary discharge electrodes, fabricated from gas-free metal, separated by a primary gap and disposed in an envelope evacuated to a pressure of $10^{-5}$ millimeters (mm.) of mercury or less. A trigger device, composed of gas-charged metal and having a trigger gap across which a discharge is easily started, is provided to release gas ions from the metal and direct them into the primary gap whereby the primary gap can be broken down by imposition of a high voltage across the primary electrodes. When the primary discharge is terminated, the primary gap clears quickly due to diffusion of the electrode material and due to gettering of the gas by the trigger metal so that the high dielectric strength of the original evacuated gap is reestablished rapidly. Until the trigger discharge is initiated again, the primary gap will withstand very high voltages without breakdown. The response time for such a device is the time between initiation of the trigger pulse and breakdown of the primary gap. The recovery time is the time between termination of a primary discharge and the time when the primary gap is sufficiently cleared to withstand its rated voltage.

The present invention concerns an improvement of such a vacuum discharge device and specifically relates to decreasing the response and recovery times of such devices. It further relates to means for increasing the capacity of the device for current whereby the device is adapted to carry currents of the order of tens of thousands of amperes.

It is therefore an object of the present invention to provide an improved high current triggered vacuum discharge device.

It is a further object of the present invention to provide an improved triggered vacuum discharge device having short response and recovery times.

Another object of the present invention is the provision of an improved triggered vacuum discharge device which is adapted to operate quickly under very high current conditions.

Briefly, in accordance with one form of the present invention, an evacuated envelope encloses a pair of primary discharge electrodes having cooperating annular surfaces juxtaposed to define an annular primary gap. Trigger means comprising a pair of spaced surfaces of charged gas-absorbent metal, for example, titanium charged with hydrogen, are provided within the cylinder defined by the primary electrodes. When a trigger discharge is initiated between the spaced surfaces, self-generated magnetic forces will force released gas ions radially outward into the primary gap, thereby enabling initiation of the primary discharge by an electric field imposed across the primary discharge electrodes. Magnetic means are provided to move the primary discharge around the annular primary gap, thereby decreasing localized heating and erosion.

The novel features believed characteristic of the invention are set forth in the appended claims. The invention itself together with the further objects and advantages thereof may best be understood by reference to the following description taken in connection with the appended drawings in which:

FIGURE 1 is a diagrammatic representation of a triggered vacuum discharge device embodying the present invention;

FIGURE 2 is a detailed vertical cross-sectional view of a specific embodiment of the present invention;

FIGURE 3 is an alternative embodiment of a triggered vacuum discharge device embodying the present invention;

FIGURE 4 is a perspective view, with parts broken away, of the device of FIGURE 3; and FIGURE 5 is a schematic illustration of the portion of the opposed surfaces of the electrode of the device of FIGURE 4 illustrating a preferred slot arrangement.

In FIGURE 1, the discharge device is defined by evacuated, hermetically sealed envelope 1. In accordance with the practice in my triggered vacuum discharge devices, envelope 1 is evacuated to a pressure of $10^{-5}$ mm. of mercury or less. Primary discharge electrodes 2 and 3, comprising rings placed in parallel planes and defining an annular primary gap 4 between the annular faces of the rings, are disposed within the envelope 1. To insure maintenance of a proper degree of vacuum during operation, the primary electrodes are preferably composed of gas-free metal, for example copper which is substantially free of all gaseous impurities or impurities which, upon decomposition, may produce gases. If the primary electrodes 2 and 3 are fabricated from copper, the standard test for insuring proper purity may be stated as follows: The electrode is place in a vacuumized test chamber having a volume of a few liters, and is subsequently deeply eroded by repetitive arcing, for example by a voltage of commercial power and a current of 100 amperes or more. The copper is of the proper purity if the pressure level in the container, a few cycles after arcing, does not rise substantially from its initial value, in the absence of getters and pumps, even when the initial value is $10^{-5}$ mm. of mercury or less. Analytically, this requirement may be stated by the relationship that the contact material must contain less than $10^{-7}$ atomic parts of all gases.

A trigger electrode or means 5 comprises a cylinder insulating body 6 having a coating 7 of metal in which a gas has been absorbed. The body 6 may be composed of an insulating ceramic and the coating 7 may be titanium, or other metal which acts as a getter for active gases, having an active gas such as hydrogen absorbed therein. The specific materials mentioned would result in a coating of titanium hydride.

A circumferential groove, extending to a depth greater than the thickness of the metal coating, divides the metal coating into two portions or surfaces separated by a trigger gap 8. The trigger electrode 5 is preferably centered in the area defined by the annular primary electrodes 2 and 3 and the trigger gap 8 may be positioned between the planes of electrodes 2 and 3 so as to lie in the same plane as primary gap 4.

Leads 9 and 10 respectively represent connections between the primary electrodes 2 and 3 and the positive and negative sides of a primary circuit. Leads 11 and 12 represent connections between the respective portions of coating 7 and an appropriate source 13 of triggering potential.

In operation of the device, the primary circuit high voltage, which may for example range from 3 to 100 kilovolts, is applied across the primary electrodes 2 and 3, establishing a strong electric field across gap 4. Due to the extremely high dielectric strength of a vacuum, there will be no discharge across the gap 4 until the trigger is operated. When a discharge is desired, the source 13 of triggering potential may be caused to apply an appropriate pulse, which may vary from 50 volts to 10 kilovolts, to the two portions of coating 7. The trigger discharge is initiated by field emission across the trigger gap 8. The trigger discharge heats coating 7 which releases gas into the discharge. This gas is then ionized by the discharge. Since the trigger discharge effectively forms a current loop, self-generated magnetic forces force the discharge outwardly from the gap 8 along the exterior of the coating 7.

If trigger gap 8 is located centrally of the primary gap 4, the trigger discharge will encounter no impediment in passing to the primary gap. Regardless of where the trigger discharge is started, the circular nature of the device allows the magnetic forces set up to quickly move the gaseous plasma of the trigger discharge in a radial direction into the primary gap. Furthermore, location of gap 8 in the plane of gap 4 also enables faster operation of the device since the ions move directly between the gaps.

When a sufficient amount of the gaseous plasma has entered the primary gap, the gap becomes conducting, resulting in breakdown of the electric field between the primary electrodes 2 and 3. Thus, the primary discharge is initiated and the device performs its intended function.

During operation of the device, the primary discharge arc erodes the primary electrode surfaces and may melt some of the material of the electrodes. Due to the central location of the trigger electrode 5, and the position of the primary electrodes 2 and 3, eroded and melted material cannot collect in or near the trigger discharge gap 8. The trigger gap is positioned to be clear of the primary discharge and associated materials and therefore remains clean and is not "shorted out" during use. The central location of the trigger electrode 5 within the ring-shaped primary electrodes 2 and 3 and within the annular primary gap 4 is therefore an important feature of the present invention.

After the primary discharge starts, the triggering pulse may be terminated, ending the trigger discharge. When the primary discharge has served its purpose and the voltage across the primary electrodes is reduced essentially to zero, ending the discharge, the metal of coating 7 getters the gas ions within the envelope in the well-known manner, while ions eroded from the primary electrodes quickly diffuse to the various surfaces throughout the envelope. Thus, the device attains its original evacuated condition almost instantaneously after cessation of the primary discharge. This enables the device to be used in an extremely rapid succession of pulses or to withstand a rapidly following high voltage which is to be blocked.

Under the conditions of high voltage and high current which exist across the primary gap of the discharge device, the surfaces of the primary electrodes tend to erode during use. In addition to the obviously deleterious effects of erosion on the surfaces of the electrodes, the continuation of the arc in one location causes the primary electrodes to become heated to the extent that even after a current zero is reached and the gap should be cleared of charged particles, the primary electrodes may continue to thermally emit ions and electrons and contribute to re-striking of the arc. To aid in overcoming these difficulties, means such as solenoids 14 and 15 are provided in opposition around the exterior of the envelope 1 to provide a radial magnetic field which will move the primary discharge constantly around the annular gap 4.

Alternatively, a single solenoid utilizing alternating current may be used to set up an oscillating magnetic field to rotate the primary discharge. Further, vertical slots in the primary electrodes 2 and 3 and extending, for a substantial portion of their length, in a direction tangential to the boundary of the ring-shaped primary electrodes may be used to give a tangential component to the primary discharge, thereby enabling the magnetic field generated by the primary discharge current loop to exert a tangential force on the discharge, causing it to rotate. A more complete analysis of the slots mentioned may be found in U.S. Patent 2,949,520, Schneider, assigned to the assignee of the present application. Generally, any suitable means for rotating a discharge may be used to increase the useful electrode life and shorten the recovery time.

In FIGURE 2, a specific construction of the discharge device of the present invention is shown including details of sealing and electrical connection. Primary electrodes 2 and 3, and primary gap 4 remain the same. Trigger electrode 5' comprising ceramic body 6', coating 7', and trigger gap 8' is similar to that described above with the exception that ceramic body 6' is herein shown to have a hollow core area 16. Solenoids 14 and 15 correspond to those described above. The operation of this device is the same as that described with regard to FIGURE 1.

Primary electrode 2 is supported by metallic disc 17 and metallic cylinder 18 which extends through primary electrode 3. Electrical connection is supplied through exterior portion 19 of cylinder 18. The cylinder 18 is further provided with slots 20 to provide appropriate passageways for the trigger discharge from trigger gap 8' to primary gap 4. Primary electrode 3 is supported on metallic cylinder 21, concentric with cylinder 18, and electrical connection is supplied through terminal block 22.

Envelope 1', similar in function to envelope 1 of FIGURE 1, comprises cover 23 and base 24 which are hermetically sealed together by conventional means. The evacuated volume is completed by cylinder 21, sealed to base 24, ceramic insulator 25, and disc 26. Appropriate sealing members 27 are provided to insure hermetically sealed ceramic-to-metal junctions, and shields 28 may be provided to protect the ceramic-to-metal interfaces from electrical stress. Disc 26 is hermetically sealed to cylinder 18 and the hollow center of cylinder 18 is closed by ceramic insulator 29 and metallic tube 30, appropriate seals being made at the junctions of cylinder 18 and insulator 29, insulator 29 and 30, and tube 30 and ceramic body 6'. Ceramic body 6' completes the components within the enclosure.

Triggering potential for the two portions of coating 7' is supplied through cylinder 18 and disc 17 which contacts one portion of coating 7' at interface 31, and by an appropriate connection to the base of tube 30 which is in contact with the other portion of coating 7'.

When, in the construction of the above-described device, the necessary step of baking out the evacuated assembly is performed, any gas absorbed in coating 7' is removed. When an appropriate pressure of active gas is then introduced into the envelope 1' and the entire device is heated and cooled to cause the coating 7' to absorb the gas, the remaining surfaces in the interior of the envelope 1' also absorb a certain amount of gas. Thus, during operation of the device, gas unless provision is made to the contrary would be released from surfaces other than coating 7' under the heat generated by the discharge, and the required vacuum within the envelope would be destroyed.

Hollow core area 16 and tube 30 provide means for overcoming this difficulty. After the entire assembly has been baked out, the active gas is admitted to the envelope. A small heater is then inserted through tube 30 into area 16, and trigger coating 7' is heated and cooled so that it will absorb an appropriate amount of gas. The heater is removed, the system is evacuated, and, since the rest of the envelope has not been heated, a low temperature bakeout removes any remaining gas without affecting the charged coating 7'.

In FIGURE 3 of the drawing there is illustrated an alternative embodiment of the invention quite similar functionally to the embodiments of FIGURES 1 and 2. The device of FIGURE 3 includes an evacuable hermetically sealable envelope 30 composed of a plurality of annular ceramic members 31 separating and hermetically sealed in conventional fashion to a pair of upper and lower metallic end plates 32. A pair of primary electrodes 33 and 34 in the form of annuli having tapered active surfaces 35 and 36 respectively are electrically and mechanically connected with the opposed end plates 32 and juxtaposed to one another so as to define a primary gap 37. A sputter-metal shield 38 in the form of a cylindrical section is positioned surrounding the primary electrodes and is sealed to adjacent ceramic annuli by annular flange 39 which is connected thereto and provides support therefor.

A trigger electrode 40 is located concentric with primary electrodes 33 and 34 and includes a hollow ceramic cylinder 41 having a titanium or other gas absorbing metallic film 42 thereon which is grooved in the plane of main gap 37 to provide a trigger gap 43. Contact with the one portion 44 of the film on one side of the trigger gap is made through bar 45 and wire 46. Wire 46 is surrounded by granules 47 which may be of titanium and used as a getter to obtain and maintain a high vacuum within the device. The other portion 48 of the film 42 constituting the other terminal of the trigger gap is in electrical contact with the lower end piece 32 so that a trigger pulse need be supplied only between trigger lead 44 and plate 32.

As with the embodiments of FIGURES 1 and 2 of the drawing an arc is struck upon pulsing of the trigger electrode when a high potential exists between the main electrodes by the emission of a pulse of charged particles from the trigger gap into the main gap. Once an arc is struck between the electrodes of the main gap the arc may be made to rotate about the ends of the annular electrodes as in the devices, FIGURES 1 and 2, by applying a radial magnetic field produced by axial solenoids or permanent magnets with opposed fields. Alternatively, as is shown in FIGURE 4 of the drawing, which is a perspective view, with parts broken away, of the device of FIGURE 3, by cutting slanted slots into the main electrodes. In one device constructed in accord with this embodiment of the invention 24 radial slots are cut in each of the primary electrode annuli at approximately a 30° angle to the axis of the annulus with alternate slots only being cut all the way through in order to maintain mechanical strength. In practice, the slots of the opposed major electrodes are staggered so that slots do not oppose slots when the electrodes are in close juxtaposition. This practice is illustrated schematically in FIGURE 5 of the drawing. The effect of the slotted electrodes is that the main current passing through the main electrodes must flow in a curvilinear path which causes a concentration of flux lines on one side of the arc with a dearth of flux lines on the other side of the arc thus adding a mechanical force to the arc to cause it to rotate. This force may be relied upon exclusively to cause rotation or may be used in connection with electric or permanent magnets as described hereinbefore to cause arc rotation.

The present invention thus concerns an improved triggered vacuum discharge device in which the trigger discharge or plasma is easily and quickly directed into the primary gap, allowing the device to respond rapidly. The use of annular primary electrodes with a centered trigger electrode also allows movement of the primary discharge to avoid excessive erosion which would otherwise increase the recovery time and decrease the period of useful life. Furthermore, the specific trigger electrode structure disclosed provides convenient means for charging the trigger electrode coating with gas without loading the remaining interior surfaces with gas.

The specific embodiment described herein is presented merely as an example of the various forms the practice of this invention may take. Therefore it is intended in the appended claims to cover all modifications and variations which may come within the true spirit and scope of this invention.

What I claim as new and desire to secure by Letters Patent of the United States is:

1. A triggered vacuum discharge device comprising:
 (a) an evacuated, hermetically sealed envelope;
 (b) a pair of primary discharge electrodes located within said envelope comprising rings lying in parallel planes and defining a primary gap therebetween;
 (c) trigger means located within the area encompassed by said rings for enabling the initiation of a primary discharge therebetween, said trigger means including:
  (aa) a trigger gap defined by spaced electrically insulated trigger surfaces on a non-conducting body, each said surface comprising a charged gas-absorbent metal coating;
  (bb) said trigger gap being located between said planes of said rings;
 (d) means for applying a triggering potential to said trigger surfaces for establishing a trigger discharge therebetween to release and ionize said gas absorbed in said metal coating; and (e) means for applying a voltage to said primary electrodes to establish an electric field therebetween so that the release and ionization of said gas by said trigger discharge is effective to initiate a discharge between said primary electrodes.

2. A triggered vacuum discharge device comprising:
(a) an evacuated, hermetically sealed envelope;
(b) a pair of primary discharge electrodes located within said envelope comprising rings lying in parallel planes and defining a primary gap therebetween;
(c) trigger means located within the area encompassed by said rings for enabling the initiation of a primary discharge therebetween, said trigger means including:
    (aa) a trigger electrode comprising a ceramic body having a coating of gas-absorbent metal; and
    (bb) a circumferential groove in the surface of said trigger electrode dividing said metal coating into two portions separated by ceramic;
    (cc) said groove lying between said planes of said rings;
(d) means for applying a trigger voltage to said two coating portions for establishing a trigger discharge between said portions to release and ionize said gas absorbed in said metal; and
(e) means for applying a voltage to said primary electrodes to establish an electric field therebetween so that the release of said gas by said trigger discharge is effective to initiate a discharge between said primary electrodes.

3. The triggered vacuum discharge device of claim 2 wherein:
(a) said trigger electrode includes a cylinder mounted coaxially with said rings and said primary gap.

4. The triggered vacuum discharge device of claim 2 wherein:
(a) said ceramic body is provided with a hollow center open to ambient atmosphere for the introduction of heating means to effect charging of said coating with gas.

5. In a triggered vacuum discharge device, the combination of:

(a) an evacuated, hermetically sealed envelope;
(b) primary electrodes enclosed in said envelope comprising a pair of rings arranged in juxtaposed parallel relation to define an annular primary gap therebetween;
(c) concentrically arranged supports for said primary electrodes;
    (aa) said supports extending at right angles to the plane of the juxtaposed surfaces of said electrodes which define the primary gap,
    (bb) the inner of said supports extending through one of said primary electrodes and supporting the other of said primary electrodes,
(d) trigger means located within the area encompassed by said primary electrodes for enabling the initiation of a primary discharge therebetween, said trigger means comprising:
    (aa) a pair of trigger surfaces defining a trigger gap, at least one of said surfaces being composed of a charged gas-absorbent metal;
(e) means for applying a trigger potential to said trigger surfaces for establishing a trigger discharge therebetween to release said gas absorbed in said metal; and
(f) means for applying a voltage to said primary electrodes to establish an electric field therebetween so that the release of said gas by said metal is effective to enable a discharge between said primary electrodes.

References Cited by the Examiner

UNITED STATES PATENTS

| | | | |
|---|---|---|---|
| 2,093,892 | 9/1937 | Lemmers | 313—174 X |
| 2,591,370 | 4/1952 | Hezson | 313—231 |
| 2,683,235 | 7/1954 | Rozoson | 313—231 |
| 2,723,324 | 11/1955 | Barnett | 313—181 X |
| 3,087,092 | 4/1963 | Lafferty | 313—187 X |
| 3,188,514 | 6/1965 | Cobine | 313—174 |

JAMES W. LAWRENCE, *Primary Examiner.*

GEORGE N. WESTBY, *Examiner.*

S. D. SCHLOSSER, *Assistant Examiner.*